UNITED STATES PATENT OFFICE.

JAMES F. JARBOE, OF CHENAULTT, KENTUCKY.

FERTILIZER.

No. 897,624.　　　　Specification of Letters Patent.　　　Patented Sept. 1, 1908.

Application filed August 22, 1907. Serial No. 389,733.

*To all whom it may concern:*

Be it known that I, JAMES F. JARBOE, a citizen of the United States, residing at Chenaultt, in the county of Breckinridge, State of Kentucky, have invented certain new and useful Improvements in Fertilizers; and I do hereby declare the following to be a full, clear, and exact description of the invention, such as will enable others skilled in the art to which it appertains to make and use the same.

This invention has relation to fertilizers or composts that are capable of being produced on farms from barnyard manure and relatively inexpensive materials that are easily procurable in any market.

It is not only the purpose of my invention to provide a process for manufacture of a cheap and valuable fertilizer that may be readily produced and utilized when made, but to also produce a method whereby a fertilizer may be made that will at once be an efficient insecticide and fungicide and a most highly efficient permanent fertilizer, furnishing it with all of the elements and gases necessary to the promotion of plant life, and leaving it rich with humus.

My improved fertilizer comprises in its composition the following ingredients, viz., chlorid of sodium, (common salt), paris green, copper sulfate, kerosene, soap, barnyard manure or earth or both, nitrogen, in the form of ammonia, muriate of potash, phosphoric acid and lime.

The manure or earth mentioned acts as a filler, and either one or both may be employed. It is preferable that the filler should be composed entirely of manure or at least partially of manure. Where the filler is composed partially of barnyard manure and partially of earth, it is desirable, if it can be done, to use for each layer of filler three inches of manure and one of earth. Layers of this kind may be employed with the following substances: chlorid of sodium, twenty pounds; paris green, three pounds; copper sulfate, three pounds; kerosene, one pint; soft soap, one quart; or hard soap, one-quarter of a pound; nitrogen in the form of sulfate of ammonia, forty pounds; muriate of potash, eighty pounds; phosphoric acid, one hundred and forty pounds, and lime (eventually) twenty-five to one hundred and fifty pounds.

It is understood that the foregoing ingredients, with the filler, is used for the production of one ton of fertilizer.

In carrying out the process of compounding the fertilizer various ways and means may be employed. A convenient plan is the making of a compartment under a shed or roofed place, of five feet wide, by ten feet long and as deep as may be desired. One ton of the fertilizer will occupy from forty to fifty cubic feet of space, varying as to proportion of manure as a filler may vary. The suggestions given will vary somewhat in accordance with circumstances.

After cleaning the bottom of the bin or vat of the kind mentioned it may be sprinkled with five pounds of chlorid of sodium. This ingredient is not employed as a direct fertilizer, but indirectly as such, its value being due to the fact that it has the power to change unavailable into available forms of plant food, a further use being to concentrate moisture in the mass, thereby assisting in the decomposition of the vegetable matter in the manure, earth, etc.

The paris green, kerosene, and soap are used as insecticides and fungicides, as stated. In preparing this take three (pounds) of paris green, one pint of kerosene, one quart of soft soap, or one-fourth of a pound of hard soap, mix the same with ten gallons of water, or if more moisture is wanted, mix with double the quantity of water stated. After using the chlorid of sodium, as stated dampen the ground with about one gallon of the latter mixture, keeping the balance for use, one-third at a time on the next three layers of manure.

Upon the chlorid of sodium and other solutions, used as above mentioned, a quantity of pulverized manure, the finer the better, will be spread in the bin to the depth of about four inches, or say, three inches of manure and one inch of earth. Supposing this layer to be one of three to the ton, there will be spread upon it about thirteen pounds of sulfate of ammonia (being about forty pounds to the ton). After spreading on the mass the sulfate of ammonia or nitrogen, as stated, there is spread or applied about twenty-six pounds of muriate of potash to assist in supplying the requisite starch to the plant food. Upon this there is next added about forty-five pounds of phosphoric acid, which is another essential ingredient of plant food, besides assisting in the decomposition of the vegetable matter in the manure, earth, etc.

The above amount of chemicals is used in one layer of the compost, of which there are three employed to constitute a ton, the remaining two being superposed upon the first in the same order and composed of the same ingredients.

Of course, more than three layers may be contained in one heap or bin if more than one ton of the fertilizer is wanted; but the proportions specified will be preserved in building the bin or heap.

After the heap or bin is completed or filled, the mass will be covered with a covering as nearly air-tight as possible, and be allowed to stand for from twenty to one hundred days, according to the temperature of the weather and the character of the manure employed. After thorough decomposition has taken place in the mass, it may be broken apart by a fork or spade and allowed to dry, when it may be pulverized and passed through a sieve for use in a drill or it may be spread upon the ground in any usual or known way.

From twenty-five to one hundred and fifty pounds of lime to the ton of my fertilizer may be added previous to spreading the same on the ground, the quantity of lime varying according to the character of the soil.

What is claimed is—

The process herein described consisting in first disposing a layer of chlorid of sodium in a suitable receptacle, sprinkling upon the layer of chlorid of sodium a dilute solution of paris green, soap and kerosene, then disposing over the material thus treated a layer of pulverized manure and earth, then sprinkle over the layer of manure and earth a quantity of sulfate of ammonia, then dispose over the material thus treated a layer of muriate potash, then dispose over the mass a quantity of phosphoric acid, then sprinkle over the mass a quantity of chlorid of sodium, then sprinkle over the mass a dilute solution of paris green, soap and kerosene, then dispose over the mass an air tight covering and permit the mass to remain a sufficient time to permit the complete amalgamation of the ingredients, the time varying from twenty to one hundred days according to the temperature of the weather, then disintegrating the mass and exposing to the atmosphere until dried, then pulverizing the mass.

In testimony whereof, I affix my signature, in presence of two witnesses.

JAMES F. JARBOE.

Witnesses:
SCOTT CUNNINGHAM,
JAMES L. HIGDON.